US009152518B2

(12) United States Patent
Busaba et al.

(10) Patent No.: US 9,152,518 B2
(45) Date of Patent: Oct. 6, 2015

(54) IN SITU PROCESSOR RE-CHARACTERIZATION

(75) Inventors: Fadi Y. Busaba, Poughkeepsie, NY (US); Steven R. Carlough, Wappingers Falls, NY (US); Christopher A. Krygowski, Lagrangeville, NY (US); Brian R. Prasky, Wappingers Falls, NY (US); Chung-Lung K. Shum, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 518 days.

(21) Appl. No.: 13/353,544

(22) Filed: Jan. 19, 2012

(65) Prior Publication Data

US 2013/0191678 A1 Jul. 25, 2013

(51) Int. Cl.
- *G06F 11/24* (2006.01)
- *G06F 1/26* (2006.01)
- *G06F 1/32* (2006.01)
- *G06F 1/20* (2006.01)

(52) U.S. Cl.
CPC ............... *G06F 11/24* (2013.01); *G06F 1/206* (2013.01); *G06F 1/32* (2013.01); *G06F 1/324* (2013.01)

(58) Field of Classification Search
CPC ............ G06F 11/24; G06F 1/26; G06F 1/32; G06F 1/206; G06F 1/324
USPC .................. 713/100, 320, 322, 324, 501, 300
See application file for complete search history.

(56) References Cited

U.S. PATENT DOCUMENTS

| | | | |
|---|---|---|---|
| 5,490,059 A | 2/1996 | Mahalingaiah et al. | |
| 5,623,647 A | 4/1997 | Maitra | |
| 6,803,782 B2 | 10/2004 | Brandon et al. | |
| 7,650,527 B2 | 1/2010 | Rambo et al. | |
| 7,895,374 B2 | 2/2011 | Ferraiolo et al. | |
| 7,900,086 B2 | 3/2011 | Datta et al. | |
| 8,635,470 B1 * | 1/2014 | Kraipak et al. | 713/300 |
| 2003/0065960 A1 * | 4/2003 | Rusu et al. | 713/300 |
| 2004/0025067 A1 * | 2/2004 | Gary et al. | 713/300 |
| 2006/0095798 A1 * | 5/2006 | Finkelstein et al. | 713/300 |
| 2007/0050660 A1 | 3/2007 | Ferren et al. | |
| 2008/0028244 A1 * | 1/2008 | Capps et al. | 713/324 |
| 2008/0077282 A1 * | 3/2008 | Hartman et al. | 700/300 |
| 2009/0138737 A1 * | 5/2009 | Kim et al. | 713/322 |
| 2009/0138772 A1 | 5/2009 | Bertacco et al. | |

(Continued)

OTHER PUBLICATIONS

Imai, Masashi et al., "Pair and Swap: An Approach to Graceful Degradation for Dependable Chip Multiprocessor," International Conference on Dependable Systems and Networks Workshops (DSN-W), pp. 119-124.

(Continued)

*Primary Examiner* — Jaweed A Abbaszadeh
*Assistant Examiner* — Terrell Johnson
(74) *Attorney, Agent, or Firm* — Margaret A. McNamara, Esq.; Matthew M. Hulihan, Esq.; Heslin Rothenberg Farley & Mesiti P.C.

(57) ABSTRACT

A re-characterization process is provided that adjusts one or more operating parameters of a processor to improve the health (e.g., reduce errors) of the processor. The parameters include voltage and/or clock frequency, as examples. The processor can be an inactive or active processor for which the re-characterization process is performed. It is performed, in one instance, by a hardware controller in real-time.

19 Claims, 3 Drawing Sheets

(56) References Cited

U.S. PATENT DOCUMENTS

2009/0328055 A1 12/2009 Bose et al.
2010/0122109 A1 5/2010 Rambo et al.
2012/0159216 A1* 6/2012 Wells et al. .................. 713/322

OTHER PUBLICATIONS

Rakosi, Zoltan E. et al., "Hot-Swapping Architecture Extension for Mitigation of Permanent Functional Unit Faults," International Conference on Field Programmable Logic and Applications, FPL 2009, Aug. 2009, pp. 578-581.

Shyam Smitha et al., "Ultra Low-Cost Defect Protection for Microprocessor Pipelines," Proceedings of the 12$^{th}$ International Conference Architecture Support for Programming Languages and Operating Systems, ASPLOS-XII, Dec. 2006, pp. 73-82.

"z/Architecture—Principles of Operation," IBM Publication No. SA22-7832-08, Ninth Edition, Aug. 2010.

Busaba et al., "In Situ Processor Re-Characterization," U.S. Appl. No. 13/681,050, filed Nov. 19, 2012, 24 pages.

International Search Report and Written Opinion for PCT/EP2013/050459 dated Jun. 27, 2013, 13 pages.

Office Action issued in co-pending U.S. Appl. No. 13/681,050, dated Nov. 19, 2014.

* cited by examiner

IN SITU PROCESSOR RE-CHARACTERIZATION

BACKGROUND

One or more aspects of the present invention relate, in general, to processing within a computing environment, and in particular, to re-characterizing processors of the computing environment.

Typically, highly reliable computer systems are constructed from multiple processing elements (referred to herein as processors), some of which may be inactive spares to be used in the case of processor failure. As spare processors are consumed as replacements, the failing processors are placed into an inactive state.

The failing processors in the inactive state often remain in that state until they are physically replaced by other processors. If too many processors become inactive due to failure and are not replaced, the system may run out of spares resulting in a degrade in system performance or a reduction in system capacity.

BRIEF SUMMARY

Shortcomings of the prior art are overcome and additional advantages are provided through the provision of a computer system for facilitating processing in a computing environment. The computer system includes a memory and a processor in communications with the memory, and wherein the computer system is configured to perform a method. The method includes, for instance, checking one or more operating parameters of a processor to determine whether at least one operating parameter of the one or more operating parameters is to be adjusted; based on the checking determining that at least one operating parameter is to be adjusted, adjusting the at least one operating parameter, wherein the adjusting is performed in real-time during execution of a production workload in that other processors of the computing environment remain operational; and based on the adjusting, initiating testing of the processor to determine whether the processor is operating at an acceptable operating level with the at least one adjusted operating parameter, wherein based on the testing indicating the processor is operating at an acceptable operating level, the processor is available to execute workload.

Methods and computer program products relating to one or more aspects of the present invention are also described and claimed herein. Further, services relating to one or more aspects of the present invention are also described and may be claimed herein.

Additional features and advantages are realized through the techniques of one or more aspects of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of one or more aspects of the invention are apparent from the following detailed description taken in conjunction with the accompanying drawings in which:

DETAILED DESCRIPTION

In accordance with an aspect of the present invention, a capability is provided to re-activate an inactive processor, which was operating at an unacceptable level, by running a re-characterization process (e.g., an electrical characterization process) on the processor to determine a set of operating parameters which will allow the processor to perform at an acceptable operating level (e.g., without re-occurring errors). The re-characterization process is performed without powering down the processor or the computer system. In one embodiment, the re-characterization process is performed in a production environment (e.g., non-test environment). One or more aspects of the re-characterization process are performed in real-time in which other processors remain operational. In further embodiments, the re-characterization process is performed on active processors to, for instance, improve system performance, or on spare processors to check their health.

Figure 1A:
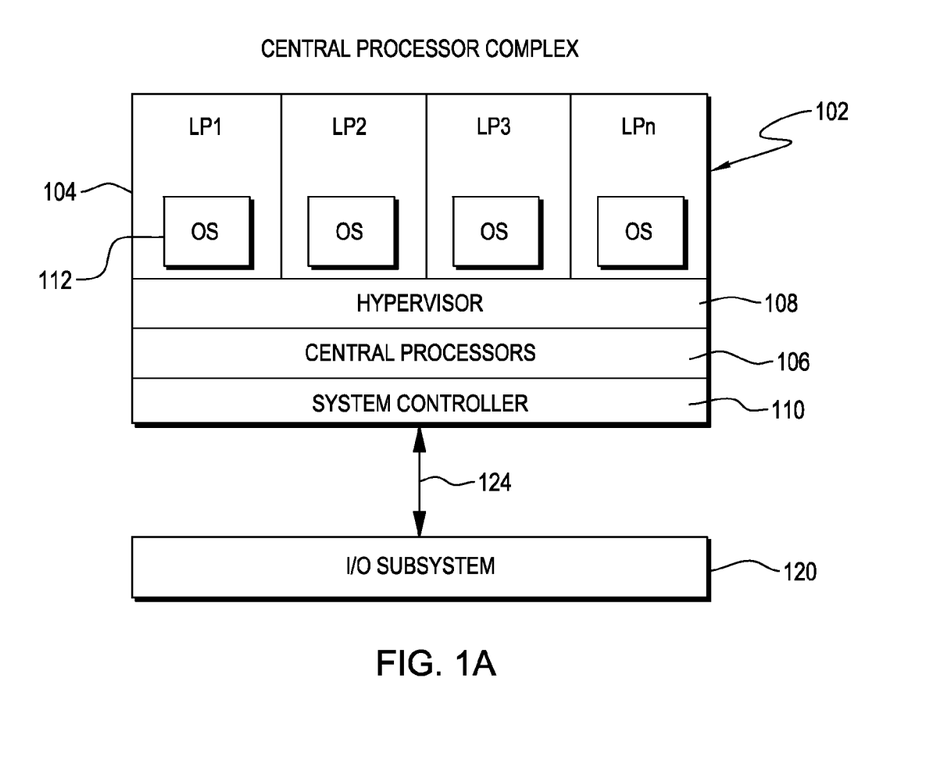
FIG. 1A depicts one embodiment of a computing environment to incorporate and use one or more aspects of the present invention.

One embodiment of a computing environment to incorporate and use one or more aspects of the present invention is described with reference to FIG. 1A. A computing environment 100 is based, for instance, on the z/Architecture® offered by International Business Machines Corporation, Armonk, N.Y. The z/Architecture® is described in an IBM Publication entitled, "z/Architecture—Principles of Operation," IBM® Publication No. SA22-7832-08, Ninth Edition, August 2010, which is hereby incorporated herein by reference in its entirety. In one example, a computing environment based on the z/Architecture® includes a System Z® server offered by International Business Machines Corporation, Armonk, N.Y. IBM®, z/Architecture® and System Z®, as well as z/OS® mentioned below, are registered trademarks of International Business Machines Corporation, Armonk, N.Y. Other names used herein may be registered trademarks, trademarks or product names of International Business Machines Corporation or other companies.

As one example, computing environment 100 includes a central processor complex (CPC) 102 coupled to an input/output (I/O) subsystem 120. Central processor complex 102 includes, for instance, one or more partitions 104 (e.g., logical partitions LP1-LPn), one or more central processors 106, a hypervisor 108 (e.g., a logical partition manager), and a system controller 110, each of which is described below.

Each logical partition 104 is capable of functioning as a separate system. That is, each logical partition can be independently reset, initially loaded with an operating system, if desired, and operate with different programs. An operating system or application program running in a logical partition appears to have access to a full and complete system, but in reality, only a portion of it is available. A combination of hardware and firmware keeps a program in a logical partition from interfering with a program in a different logical partition. This allows several different logical partitions to operate on a single processor or multiple physical processors in a time-sliced manner.

As used herein, firmware includes, e.g., the microcode, millicode, and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

In this particular example, each logical partition has a resident operating system 112, which may differ for one or more logical partitions. In one embodiment, operating system 112 is the z/OS® operating system, offered by International Business Machines Corporation, Armonk, N.Y. Further, in this example, each logical partition has assigned thereto a portion of system main storage (memory), which is referred to as a zone.

A logical partition 104 includes one or more logical processors. Each logical processor may have a central processor 106 permanently allocated thereto, or there may be a pool of central processors 106 available for dynamic allocation to any group of logical processors, possibly spanning multiple logical partitions 104.

Logical partitions 104 are managed by hypervisor 108 implemented, for instance, by firmware running on processors 106. Logical partitions 104 and hypervisor 108 each comprise one or more programs residing in respective portions of main storage associated with the central processor. One example of hypervisor 108 is the Processor Resource/Systems Manager™ (PR/SM), offered by International Business Machines Corporation, Armonk, N.Y.

Central processors 106 are coupled to, but separate from, system controller 110. System controller 110 is, for instance, a hardware component that controls access to memory and caches within the central processors, and communicates between the central processors and input/output subsystem 120. The system controller is responsible for the queuing, serialization, and execution of requests made by the central processors and the I/O subsystem. In one example, it is responsible for sending commands to particular central processors and/or broadcasting commands to multiple central processors. The system controller may be a centralized component or its functions may be distributed. The system controller is not a processor or core; for example, it does not execute user applications. Instead, it is the communications mechanism between the I/O subsystem and the central processors.

Figure 1B:
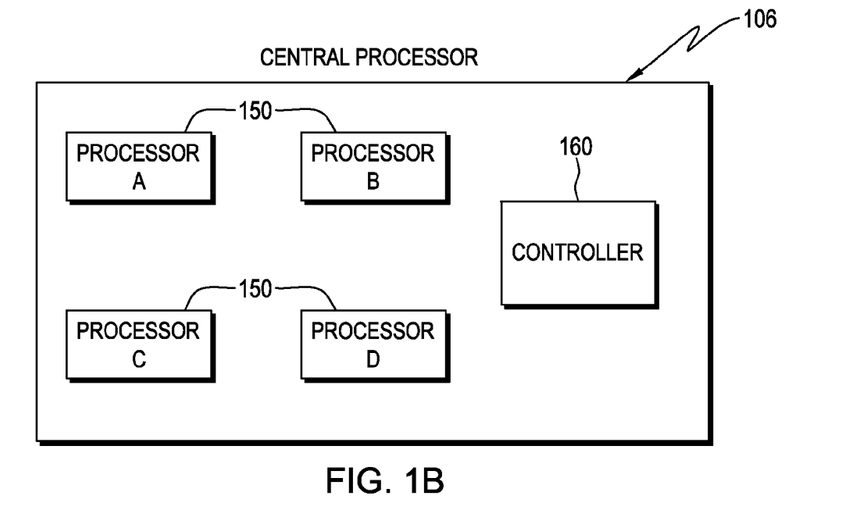
FIG. 1B depicts further details of the central processors of FIG. 1A, in accordance with an aspect of the present invention.

Further details regarding central processors 106 are described with reference to FIG. 1B. In one example, a central processor 106 includes one or more cores or processors 150, which are the physical processors that are allocated to one or more logical partitions. A central processor is considered part of a node, and each node includes one or more central processors. A logical partition can span nodes in which one or more central processors from one node and one or more central processors from another node can be assigned to the logical partition.

Further, in accordance with an aspect of the present invention, central processor 106 includes a controller 160 (e.g., hardware controller) used to perform re-characterization to adjust the parameters of a processor, which may be inactive or active. An inactive processor is a processor that is not currently accepting workload to be executed. It may be a processor which was performing at an unacceptable level, and therefore, its workload was moved to another processor, but it is still powered up; or it may be a spare processor waiting to be activated. An active processor is a processor that is ready to receive and execute workload and/or is executing workload.

One embodiment of the logic associated with a re-characterization process is described with reference to FIG. 2. In one example, this logic is performed by controller 160 (FIG. 1B), unless otherwise specified.

Figure 2:
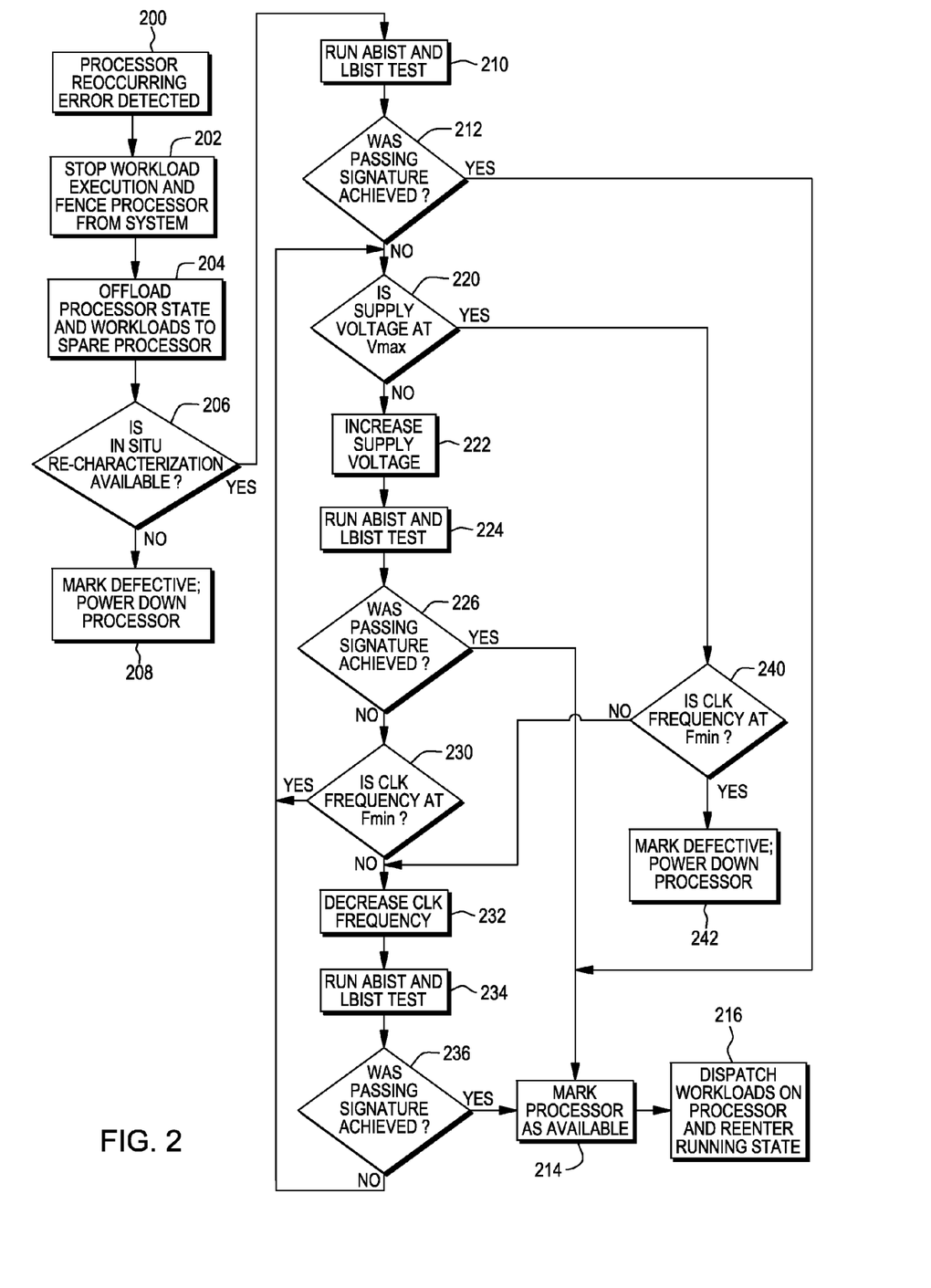
FIG. 2 depicts one embodiment of the logic to re-characterize a processor operating at an unacceptable level, in accordance with an aspect of the present invention.

Referring to FIG. 2, initially, in this example, it is determined that a particular processor (e.g., Processor A) has re-occurring errors, STEP 200. For example, each processor has self-testing logic used to determine if it is running correctly. In particular, each processor includes error checking logic used to determine if an error has occurred. If an error has occurred, the processor uses its recovery logic to recover itself. It tracks the number of times it has to recover in a predetermined amount of time, and if it finds it is recovering too often (e.g., the count of times it has to recover exceeds a threshold), then it detects that it has re-occurring errors.

Responsive to determining the processor has re-occurring errors, the workload execution of that processor is stopped and the processor is fenced from the system, STEP 202. In one embodiment, the processor reports to the hypervisor that it has re-occurring errors, and responsive thereto, the hypervisor stops the tasks on the processor. The processor is isolated in the system in that the hypervisor still knows of the processor, but no work is assigned to the processor and the processor does not include any information needed by another processor.

Additionally, the processor's state and its workload are offloaded from the processor (e.g., Processor A) to a spare processor (e.g., Processor B), STEP 204. In one example, the processor or another component initiates the offloading, which is performed by the hypervisor or firmware. The offloading includes saving the current state, including architected and internal state, and at least an identification or pointer to the workload, and placing them on one or more other processors (e.g., spares).

Thereafter, a determination is made as to whether in situ re-characterization is available, INQUIRY 206. That is, is the capability of one or more aspects of the present invention available on the system. This can be determined, in one example, by an indicator (e.g., a bit in shared memory) that indicates whether re-characterization is available. If re-characterization is not available, then the processor is marked as defective and, in one example, is powered down, STEP 208, and processing is complete.

However, if in situ re-characterization is available, then standard diagnostic tests (e.g., Array Built-In Self-Test (ABIST) and Logic Built-In Self-Test (LBIST)) are initiated by the controller and run on the processor, STEP 210. As is known, the Array Built-In Self-Test component runs internal diagnostics as part of the system boot process. ABIST tests the logic and arrays in each processor (as applicable) and performs array repair (bit sparing) for processors, if necessary. The Logic Built-In Self-Test is a means whereby an integrated circuit tests the integrity of its own circuitry. LBIST operates by exercising the integrated circuit logic and then detecting if the logic behaved as intended. In practice, an integrated circuit with LBIST tests special test circuits embedded for generating the stimulus and detecting the response. In one example, as part of the LBIST testing, the internal state of the processor is flushed and re-initialized to a known good state.

Responsive to running any diagnostic tests, a determination is made as to whether a passing signature was achieved, INQUIRY 212. This indicates whether the self-diagnostic tests were considered successful (e.g., patterns where matched, etc.). If the passing signature was achieved and received by the controller, then the processor is marked as available, STEP 214. Workloads may be dispatched to the processor and the processor may re-enter running state, STEP 216.

However, if the passing signature was not achieved (i.e., the diagnostic tests were not considered successful), then, in one embodiment, one or more operating parameters of the processor are adjusted to improve its performance (e.g., decrease errors). As examples, these parameters include voltage and/or clock frequency; however, other parameters may be adjusted, such as temperature or others. In one example, a determination is made as to whether the supply (operating) voltage to the processor is at a maximum voltage, INQUIRY 220. The maximum voltage is based on the technology and is a predetermined value. If the supply voltage is not at the maximum voltage, then the supply voltage of the processor is incremented by a predetermined amount, STEP 222. For instance, the supply or operating voltage is the voltage at which the circuit is operating. In one example, a current operating voltage is 0.95 volts and the increment is about 0.05V (approximately 5%).

Thereafter, ABIST and/or LBIST are initiated by the controller and run on the processor again, STEP 224. If a passing signature is achieved this time, INQUIRY 226, then processing continues with STEP 214, and the processor is marked as available. (In a further embodiment, the clock frequency is also checked and may be adjusted, in addition to adjusting the voltage, even though a passing signature is achieved. Further, in another embodiment, the diagnostic tests are self-initiated by the processor, responsive to determining an operating parameter is adjusted.)

However, if a passing signature is still not achieved, INQUIRY 226, then a determination is made as to whether the clock frequency of the processor is at a minimum value, INQUIRY 230. The minimum value is also based on the technology and is a predetermined value. If the clock signature is not at a minimum value, then it is decreased by a predetermined amount to slow down processing, STEP 232. For instance, a current operating frequency of a high-end enterprise processor, like a z-processor, is 5.2 Ghz and the decreased amount is approximately 5%.

Then, ABIST and/or LBIST are run once again, STEP 234. Responsive to running one or more of ABIST and LBIST, a determination is made as to whether the passing signature is achieved, INQUIRY 236. If it is achieved, then the processor is marked as available, STEP 214. However, if the passing signature is not achieved, or if the clock frequency is at the minimum value, INQUIRY 230, then processing continues with INQUIRY 220, and the process repeats.

Returning to INQUIRY 220, if the supply voltage is at the maximum value, then processing continues with checking the clock frequency, INQUIRY 240. If the clock frequency is at the minimum value, then the processor is still at an unacceptable operating level, so it is marked defective and, in one example, is powered down and will not be adjusted again, STEP 242. Otherwise, processing continues with STEP 232, in which the clock frequency is decreased and the other processing is performed. This completes processing of the re-characterization process.

In a further example, other operating parameters may be tested and adjusted, in addition to or in lieu of voltage and/or clock frequency. One such parameter is temperature. However, with temperature, the adjusting is indirect in that instead of directly changing the parameter, e.g., the temperature, one or more components/conditions that affect the parameter are changed, such as the chilling technique of the processor, the air temperature adjacent to the processor or the fan speed, as examples, which affect the temperature. Like voltage and clock frequency, however, after adjusting the parameter, the diagnostic tests are re-run, and the passing signature is tested.

As used herein, adjusting a parameter includes a direct control in which the parameter itself is directly adjusted, as with voltage and clock frequency, as examples, and/or an indirect control in which instead of directly adjusting the parameter, one or more components/conditions that affect the parameter are adjusted, thereby adjusting the parameter, such as with temperature, as an example.

As described above, in one embodiment, when a processor detects an error, it typically recovers itself to a known good state. If the errors are re-occurring, the state is then transferred to a spare processor and the defective processor is put into a fenced-off state. Then, a controller in the system carries out a characterization process which varies electrical properties, such as supply voltage and clock frequency, while running a set of diagnostic patterns (e.g., ABIST and LBIST). The tests are carried out until an operating point is found where the tests pass. Responsive to achieving this point, the processor is brought back on-line and receives a new workload from the workload manager.

In a further embodiment, while a processor is still active (e.g., before its state is transferred to other processors), it can also undergo this in situ type testing (e.g., when idle) to verify the processor is healthy. Further, this processing can be performed on spare processors to determine optimal operating parameters for the spares. With a rotation of the assignment of the spare processors in the system, an in situ health check can be performed on all installed processors. In one example, the in situ testing is performed at predetermined time intervals on spare or idle processors to check the health (e.g., operation quality) of the installed processors.

In one aspect, the re-characterization is performed without requiring an instruction recovery/retry controller. As one example, a defective active processor is detected and removed from an active state to an inactive state non-disruptively. While in the inactive state, the processor is exercised to determine if there is an operable state (e.g., voltage level, frequency, temperature), and if so, makes the processor available for re-activation in the new operable state. That is, instead of marking the processor as defective and not using it again, its operating parameters are adjusted to a level in which the processor is salvaged and not considered defective, albeit possibly at a degraded level. By salvaging the processor(s), it is less likely that the environment will run out of spares.

As one example, this re-characterization process is performed in real-time while other processors of the computing environment are operational. There is no disruption to services being provided by the computing environment and it is transparent to other processors of the environment.

An unacceptable operating level may be a level at which a processor has re-occurring errors, a level at which a processor is failing diagnostic tests, and/or any level that is predefined as unacceptable. For instance, an active processor may not be receiving re-occurring errors, but may be considered operating at an unacceptable level if it is not meeting certain performance characteristics or is operating at a voltage or clock frequency (or other operating parameters) that is undesirable, as examples. Similarly, a spare processor may be considered at an unacceptable operating level for similar reasons, as well as others. The unacceptable operating level may be predefined for each processor.

Moreover, in one example, a processor is operating at an acceptable operating level if it does not have re-occurring errors and/or passes diagnostic tests performed thereon. In further examples, it is operating at an acceptable level if it is meeting certain performance requirements or characteristics, or operating at certain desired operating parameters.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 3:
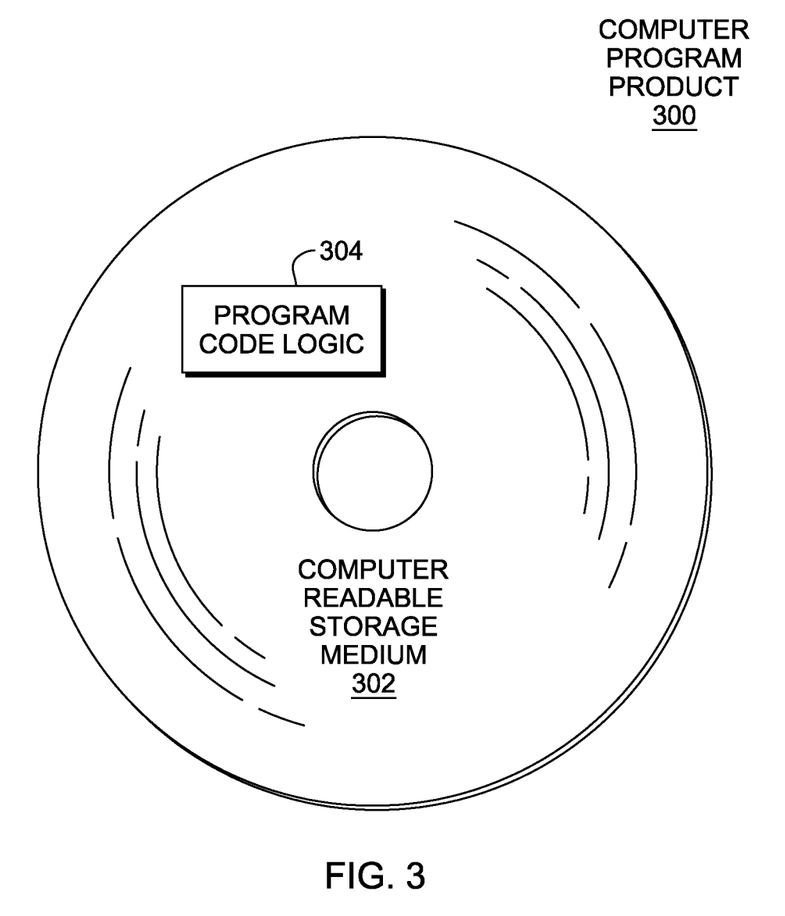
FIG. 3 depicts one embodiment of a computer program product incorporating one or more aspects of the present invention.

Referring now to FIG. 3, in one example, a computer program product 300 includes, for instance, one or more non-transitory computer readable storage media 302 to store computer readable program code means or logic 304 thereon to provide and facilitate one or more aspects of the present invention.

Program code embodied on a computer readable medium may be transmitted using an appropriate medium, including but not limited to, wireless, wireline, optical fiber cable, RF, etc., or any suitable combination of the foregoing.

Computer program code for carrying out operations for one or more aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

One or more aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of one or more aspects of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. Further, a central processor may include more or less processors than described herein. Yet further, the processors need not be part of a central processor. Moreover, other operating parameters in addition to and/or in lieu of voltage and/or clock frequency, can be adjusted to improve the health of a processor and/or for other reasons. Additionally, in one example, when a processor is marked defective, it need not be powered down. Many other changes may also be made.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

As a further example, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A computer system for facilitating processing in a computing environment, said computer system comprising:
 a memory; and
 a processor in communications with the memory, wherein the computer system is configured to perform a method, said method comprising:
  determining that a particular processor is defective;
  based on determining the particular processor is defective, checking one or more operating parameters of the particular processor to determine whether at least one operating parameter of the one or more operating parameters is to be adjusted;
  based on the checking determining that at least one operating parameter is to be adjusted, identifying and adjusting a single operating parameter of the at least one operating parameter, wherein the adjusting is performed in real-time, and wherein the adjusting in real-time includes the particular processor not being powered down and other processors of the computing environment remaining operational during execution of a production workload by the other processors; and
  based on the adjusting, initiating testing of the particular processor, the testing comprising performing one or more diagnostic tests to determine whether the particular processor is operating at an acceptable degraded operating level with the single adjusted operating parameter, wherein the acceptable degraded operating level is one in which the particular processor is operational but at a degraded level to ensure the particular processor remains available for use in the computing environment, and wherein based on the testing indicating the particular processor is operating at the acceptable degraded operating level with the single adjusted operating parameter, the particular processor is available to execute workload, and wherein based on the testing indicating the particular processor is not operating at the acceptable degraded operating level with the single adjusted operating parameter, repeating the identifying and adjusting, for another single operating parameter of the at least one operating parameter, and the initiating testing one or more times, wherein subsequent to the repeating the one or more times and the testing indicating the particular processor is not operating at the acceptable degraded operating level, powering down the particular processor.

2. The computer system of claim 1, wherein the one or more operating parameters comprise at least one of voltage, clock frequency and temperature.

3. The computer system of claim 1, wherein the method further comprises obtaining an indication that the particular processor is at an unacceptable operating level, wherein the unacceptable operating level is a level in which the particular processor has re-occurring errors, is not meeting a certain performance characteristic or is operating at an undesirable operating parameter.

4. The computer system of claim 3, wherein the unacceptable operating level is the level in which the particular processor has re-occurring errors, and wherein the obtaining comprises performing one or more diagnostic tests and receiving a failing signature that indicates the particular processor is at the unacceptable operating level, and wherein the one or more diagnostic tests are performed based on the particular processor having re-occurring errors and subsequent to offloading state from the particular processor.

5. The computer system of claim 1, wherein the checking is performed at predetermined time intervals.

6. The computer system of claim 1, wherein the checking comprises determining whether a supply voltage of the particular processor is at a predetermined voltage, and wherein the adjusting comprises changing voltage to the particular processor based on determining that the supply voltage is not at the predetermined voltage.

7. The computer system of claim 6, wherein the checking further comprises determining whether a clock frequency of the particular processor is at a predetermined frequency, based on the supply voltage being at the predetermined voltage, and wherein the adjusting comprises changing the clock frequency, based on determining that the clock frequency is not at the predetermined frequency.

8. The computer system of claim 6, wherein the checking further comprises determining whether a clock frequency is at a predetermined frequency, based on determining the operating level of the particular processor is at an unacceptable level subsequent to changing the voltage, and wherein the adjusting comprises changing the clock frequency, based on determining that the clock frequency is not at the predetermined frequency.

9. The computer system of claim 1, wherein the checking comprises determining whether a clock frequency of the particular processor is at a predetermined frequency, and wherein the adjusting comprises changing the clock frequency, based on determining that the clock frequency is not at the predetermined frequency.

10. The computer system of claim 1, wherein the acceptable degraded operating level is at an operating point in which a passing signature is achieved from the one or more diagnostic tests.

11. The computer system of claim 1, wherein the single adjusted operating parameter comprises supply voltage, wherein adjusting the single adjusted operating parameter comprises increasing the supply voltage to the particular processor, wherein the another single adjusted operating parameter comprises clock frequency, and wherein adjusting the another single adjusted operating parameter comprises decreasing the clock frequency of the particular processor.

12. A computer program product for facilitating processing in a computing environment, said computer program product comprising:
a non-transitory computer readable storage medium readable by a processing circuit and storing instructions for execution by the processing circuit for performing a method comprising:
determining that a particular processor is defective;
based on determining the particular processor is defective, checking by a hardware controller one or more operating parameters of the particular processor to determine whether at least one operating parameter of the one or more operating parameters is to be adjusted;
based on the checking determining that at least one operating parameter is to be adjusted, identifying and adjusting a single operating parameter of the at least one operating parameter, wherein the adjusting is performed in real-time, and wherein the adjusting in real-time includes the particular processor not being powered down and other processors of the computing environment remaining operational during execution of a production workload by the other processors; and
based on the adjusting, initiating testing of the particular processor, the testing comprising performing one or more diagnostic tests to determine whether the particular processor is operating at an acceptable degraded operating level with the single adjusted operating parameter, wherein the acceptable degraded operating level is one in which the particular processor is operational but at a degraded level to ensure the particular processor remains available for use in the computing environment, and wherein based on the testing indicating the particular processor is operating at the acceptable degraded operating level with the single adjusted operating parameter, the particular processor is available to execute workload, and wherein based on the testing indicating the particular processor is not operating at the acceptable degraded operating level with the single adjusted operating parameter, repeating the identifying and adjusting, for another single operating parameter of the at least one operating parameter, and the initiating testing one or more times, wherein subsequent to the repeating the one or more times and the testing indicating the particular processor is not operating at an acceptable degraded operating level, powering down the particular processor.

13. The computer program product of claim 12, wherein the checking comprises determining whether a supply voltage of the particular processor is at a predetermined voltage, and wherein the adjusting comprises changing voltage to the particular processor, based on determining that the supply voltage is not at the predetermined voltage.

14. The computer program product of claim 12, wherein the checking comprises determining whether a clock frequency of the particular processor is at a predetermined frequency, and wherein the adjusting comprises changing the clock frequency, based on determining that the clock frequency is not at the predetermined frequency.

15. The computer system of claim 1, wherein the particular processor is configured to have self-testing logic and recovery logic to recover itself from an error detected by the self-testing logic, and wherein the method further comprises:

obtaining an indication that the particular processor has re-occurring errors as determined using the recovery logic; and initially testing the particular processor, the initially testing comprising running one or more initial standard diagnostic tests on the particular processor and determining a passing signature was not achieved for the initial testing, and wherein the checking is performed based on the passing signature not achieved for the initial testing.

16. The computer system of claim 15, wherein the method further comprises determining whether re-characterization for the particular processor is available, the determining whether re-characterization is available being based on obtaining the indication that the particular processor has re-occurring errors.

17. The computer program product of claim 12, wherein the particular processor is configured to have self-testing logic and recovery logic to recover itself from an error detected by the self-testing logic, and wherein the method further comprises:

obtaining an indication that the particular processor has re-occurring errors as determined using the recovery logic; and initially testing the particular processor, the initially testing comprising running one or more initial standard diagnostic tests on the particular processor and determining a passing signature was not achieved for the initial testing, and wherein the checking is performed based on the passing signature not achieved for the initial testing.

18. The computer program product of claim 17, wherein the method further comprises determining whether re-characterization for the particular processor is available, the determining whether re-characterization is available being based on obtaining the indication that the particular processor has re-occurring errors.

19. The computer program product of claim 12, wherein the single adjusted operating parameter comprises supply voltage, wherein adjusting the single adjusted operating parameter comprises increasing the supply voltage to the particular processor, wherein the another single adjusted operating parameter comprises clock frequency, and wherein adjusting the another single adjusted operating parameter comprises decreasing the clock frequency of the particular processor.

* * * * *